US007509609B2

(12) United States Patent
Davidovic (10) Patent No.: US 7,509,609 B2
(45) Date of Patent: Mar. 24, 2009

(54) METHODS AND APPARATUS FOR REDUCING TIMING SKEW

(75) Inventor: Goran Davidovic, Unterfohring (DE)

(73) Assignee: Agere Systems Inc., Allentown, PA (US)

( * ) Notice: Subject to any disclaimer, the term of this patent is extended or adjusted under 35 U.S.C. 154(b) by 206 days.

(21) Appl. No.: 11/376,600

(22) Filed: Mar. 15, 2006

(65) Prior Publication Data

US 2007/0220466 A1 Sep. 20, 2007

(51) Int. Cl.
*G06F 9/45* (2006.01)
*G06F 17/50* (2006.01)
(52) U.S. Cl. .................................. 716/6; 716/4; 716/5
(58) Field of Classification Search ................. 716/4–6, 716/8–14
See application file for complete search history.

(56) References Cited

U.S. PATENT DOCUMENTS

| | | | | |
|---|---|---|---|---|
| 5,550,748 | A * | 8/1996 | Xiong | 716/13 |
| 6,311,313 | B1 * | 10/2001 | Camporese et al. | 716/6 |
| 6,466,008 | B1 * | 10/2002 | Fung et al. | 324/158.1 |
| 6,701,507 | B1 * | 3/2004 | Srinivasan | 716/10 |
| 7,191,417 | B1 * | 3/2007 | Luo et al. | 716/6 |
| 7,257,797 | B1 * | 8/2007 | Waller et al. | 716/14 |
| 2004/0064799 | A1 * | 4/2004 | Reyes | 716/6 |
| 2004/0117742 | A1 * | 6/2004 | Emberling et al. | 716/1 |
| 2004/0153984 | A1 * | 8/2004 | Akkiraju | 716/6 |
| 2004/0163058 | A1 * | 8/2004 | Frank et al. | 716/5 |
| 2004/0250230 | A1 * | 12/2004 | Itou et al. | 716/15 |
| 2006/0248488 | A1 * | 11/2006 | Habitz et al. | 716/10 |

\* cited by examiner

*Primary Examiner*—Paul Dinh
*Assistant Examiner*—Nha T Nguyen (57) ABSTRACT

Reducing timing skew begins with identifying signals that are to have a reduced timing skew. These identified signals are then routed to reduce the layout distance of each signal path. Among these identified signals, a longest signal path is found and the signal paths of the remaining identified signals are lengthened. The lengthening is done to each of the remaining identified signal paths to each have a length substantially equal to the longest signal path whereby the timing skew between the identified signals is reduced. A signal length matching process may be stored as a program in a computer-readable medium with the program operable on a computer system tailored for providing chip placement and routing processes.

10 Claims, 7 Drawing Sheets

METHODS AND APPARATUS FOR REDUCING TIMING SKEW

FIELD OF INVENTION

The present invention relates generally to improved methods and apparatus for reducing timing skew, and more particularly to advantageous techniques for matching the lengths of multiple signal paths in an integrated circuit layout.

BACKGROUND OF INVENTION

System on a chip designs continue to grow in complexity and performance as technology processes provide greater and greater densities. With increased densities and more and more signal paths having strict timing requirements, the routing of the numerous signal paths with minimum capacitance and signal to signal timing skew typically exceeds the capabilities of existing routing tools. The existing routing tools usually have features allowing special routing for data buses in order to reduce the skew between different data bits. The purpose of such a routing is to make sure that all the data bits in the bus are propagating to the destination within one clock cycle. Depending on the technology, routing distance and number of the signals, one can expect the timing skew to be reduced down to 50-100 picoseconds (ps) for rise edge skew or fall edge skew only. Requiring the skew to be reduced even further and also to reduce the skew between the rising and falling signal edges of multiple signals goes beyond the typical current routing tool capabilities.

A specific example of a high speed critical interface is an external memory interface. The external memory interface supplies input and output data paths between a chip and memory. Many times the interface runs at the highest clock rate of the chip. Depending upon the number of signals in the data path and the number of control lines and clocks, a significant number of high speed data paths may have to be routed to meet stringent timing requirements. Due to the complexities of current and future chip designs with thousands to millions of interconnecting wires, the use of current tools is not adequate to route these critical interface paths with minimum skew. For example, with a double data rate (DDR) external memory interface, the skew tolerance is very critical because data is transferred between the memory and the chip every half a clock cycle, using both edges of an interface clock. Data and clock signals in the DDR external memory interface propagate through the chips inputs and outputs, packaging, and printed circuit board paths which introduce noise on the signals. Due to the noise and signal skew, the clocking point where data is valid in a receiver circuit is critical with little tolerance. With DDR memory speeds exceeding 1 Gb/s, there is increased demand for reducing the rise/fall skew on the chip.

SUMMARY OF INVENTION

Among its several aspects, the present invention recognizes that there is a need for achieving very low signal skew on signal paths having tight timing requirements. By way of example, such circuits may be advantageously employed in an external double data rate (DDR) memory interface.

To these ends, an embodiment of the present invention includes a method for reducing timing skew. The method begins with identifying signals that are to have a reduced timing skew. These identified signals are then routed to reduce the layout distance of each signal path. Among these identified signals, a longest signal path is found and the signal paths of the remaining identified signals are lengthened. The lengthening is done to each of the remaining identified signal paths, so that all these paths have a length substantially equal to the length of the longest path, thereby reducing the timing skew between the identified signals.

Another embodiment of the present invention addresses a computer-readable medium whose contents cause a computer system to perform a signal length matching process. The process begins with identifying signals that are to have a matching length. Then the identified signals are routed to reduce the layout distance of each signal path. Among the identified signals, a longest signal path is found and then identified signals having a signal path with a length less than the longest signal path are lengthened to produce adjusted signal paths each with a length substantially equal to the longest signal path length.

In another embodiment of the present invention a system is used for providing a signal length matching process. The system is made up of a processing system storing a signal length matching program and a storage unit having a chip database containing chip placement and routing information accessible by the signal length matching program. The system also includes means for identifying signals in the chip database that are to have matching length. Means are also provided for running the signal length matching program, whereby the identified signals are routed with reduced layout lengths and then selectively lengthened to all be substantially equal to a longest identified signal path routed.

A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
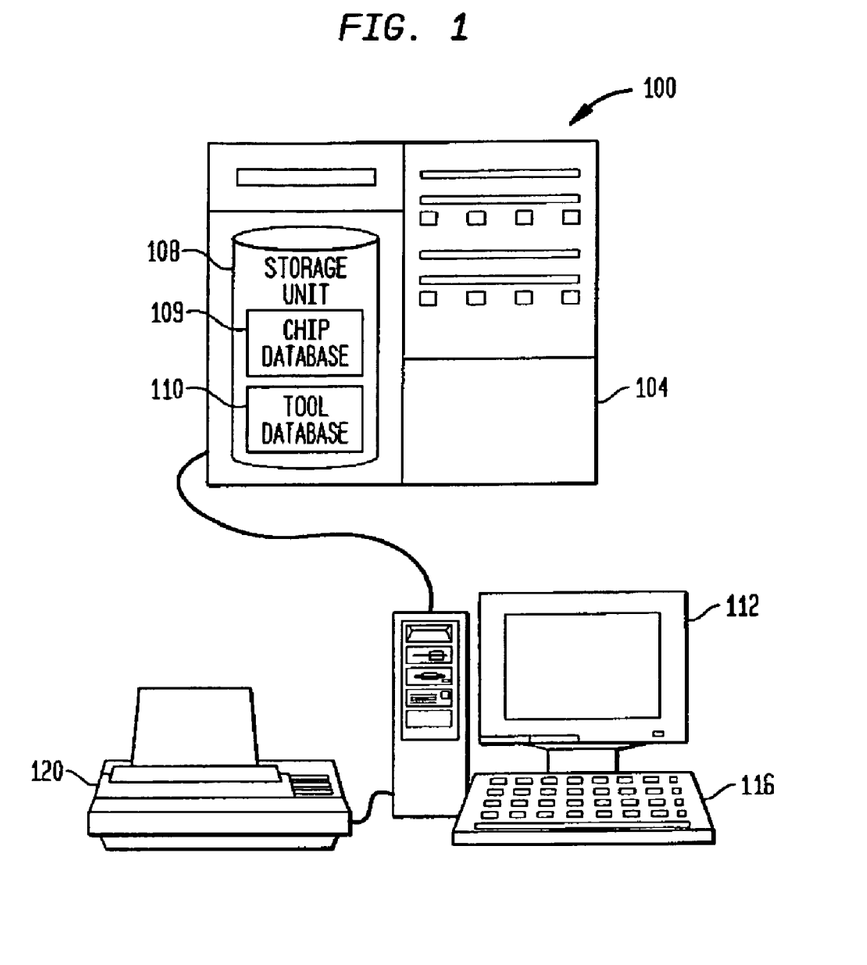
FIG. 1 illustrates a chip routing system in accordance with the present invention.

FIG. 1 illustrates a chip routing system 100 in accordance with the present invention. The chip routing system 100 uses a processor 104 which has a storage unit 108 for storing a chip database 109, a tools database 110, and the like, and interfaces with a monitor 112, keyboard 116, and printer 120. The processor 104 runs a high level place and route process and a signal length matching process as described in more detail below. While other programming languages, compilers, operating systems and processors may be used, the signal length matching process may be written in a C programming language using a GNU C compiler and the processor 104 may be a Solaris™ processor, for example. The program implementing the signal length matching process may be stored as electronic media in the storage unit 108 on a high density disk drive, an optical disk drive, or the like. The program as a computer-readable medium may also be downloaded over a communication network from a remote network device, such as a server or mass storage unit.

Figure 2:
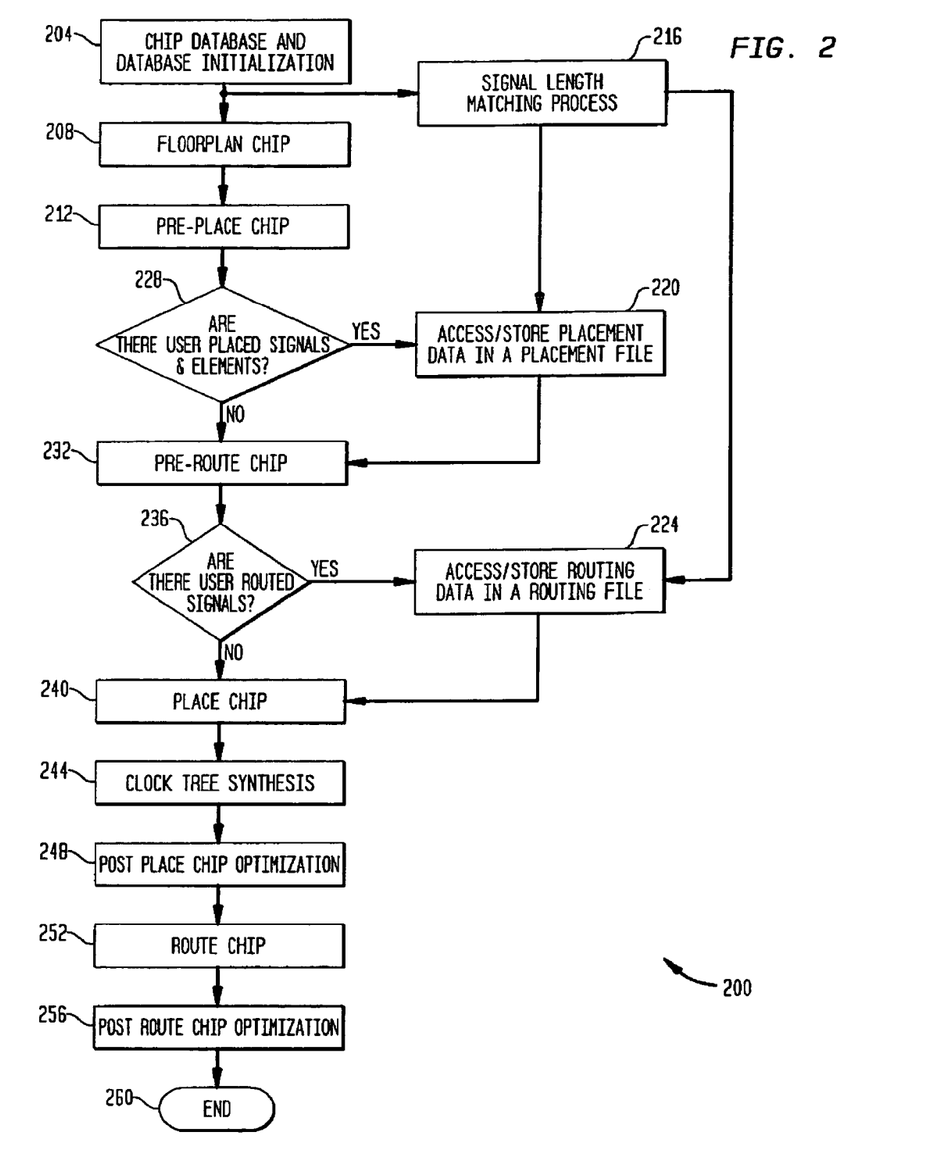
FIG. 2 illustrates a high level place and route process in accordance with the present invention.

FIG. 2 illustrates a high level place and route process 200 in accordance with the present invention. The high level place and route process 200 begins with an initialization step 204 of the chip database 109 in storage unit 108. In step 204, the chip description, as specified by a netlist generated after synthesizing a chip design written in a high level language, such as, the very high speed integrated circuit hardware description language (VHDL), is used to initialize the chip database to the specific chip that is to be placed and routed. In step 204, signals that are to be matched in length are identified. It is noted that signals that are to be matched in length may include, critical signal data paths and buses, clock or strobe paths, and control signal paths. The signals that are to be matched in length may be identified by applying a special identification property to each path and each element associated with the path. These user identified paths and elements are not processed in the normal flow used for signal paths and elements not so identified.

After step 204, the process 200 proceeds to step 208 and step 216. In step 208, the major functional units of the chip are organized for placement in an initial floorplan to provide minimum area and short signal path lengths. After the initial floorplan has been generated, a pre-place process 212 is used to initially place the circuit elements used in the functional units.

In step 216, a signal length matching process is started. The signal length matching process 216 uses a signal length matching program, described in more detail below, to read the user identified signals that are to be matched in length and their associated signal path elements from the chip database 109 in storage unit 108. The signal length matching process 216 then generates user placement data for the identified signals and their associated signal path elements. The user placement data is stored in step 220 in a placement file in the chip database 109 in storage unit 108. The signal length matching process 216 also generates user routing data for the identified signals. The user routing data is stored in step 224 in a routing file in the chip database 109 in storage unit 108. The user placement data stored in step 220 and the user routing data stored in step 224 are also referred to as user placed signals and elements and user routed signals, respectively.

After the other portions of the chip have been pre-placed in step 212, it is determined, in decision step 228, whether there are user placed signals and elements. If there are user placed signals and elements, the placement file is accessed in step 220 and the user placement data for the identified signals and their associated elements is passed to a pre-route chip step 232. If there were no user placed signals and elements, the process 200 continues from the decision step 228 to the pre-route chip step 232.

The pre-route chip step 232 receives pre-placed data from the pre-place chip step 212 and may receive user placement data from the placement file stored in step 220. The pre-route chip step 232 routes the chip taking into account the user placement data for the user identified signals and their associated elements. In decision step 236, it is determined whether there are user routed signals. With user routed signals, the routing file is accessed in step 224 and the user routing data is passed to the place chip step 240. With no user routed signals, the process 200 continues from the decision step 236 to place the chip in place chip step 240. The place chip step 240 receives routing data from the pre-route chip step 232 and may receive user routing data from the routing file stored in step 224. The place chip step 240 makes an initial chip placement based on the available information obtained from the chip database 109 in storage unit 108.

After the place chip step 240, a clock tree is synthesized in a clock tree synthesis step 244. A post place chip option to further optimize the initial chip placement based on the results of the clock tree synthesis step 244 is done in post place chip option step 248. The chip is routed in route chip step 252 using the user routing information and results of the clock tree synthesis step 244. Following the route chip step 252, a post route chip optimization step 256 is employed to resolve any timing or routing issues which may have surfaced during the route chip step 252. Finally, in step 260, the high level place and route process 200 ends.

Figure 3A:
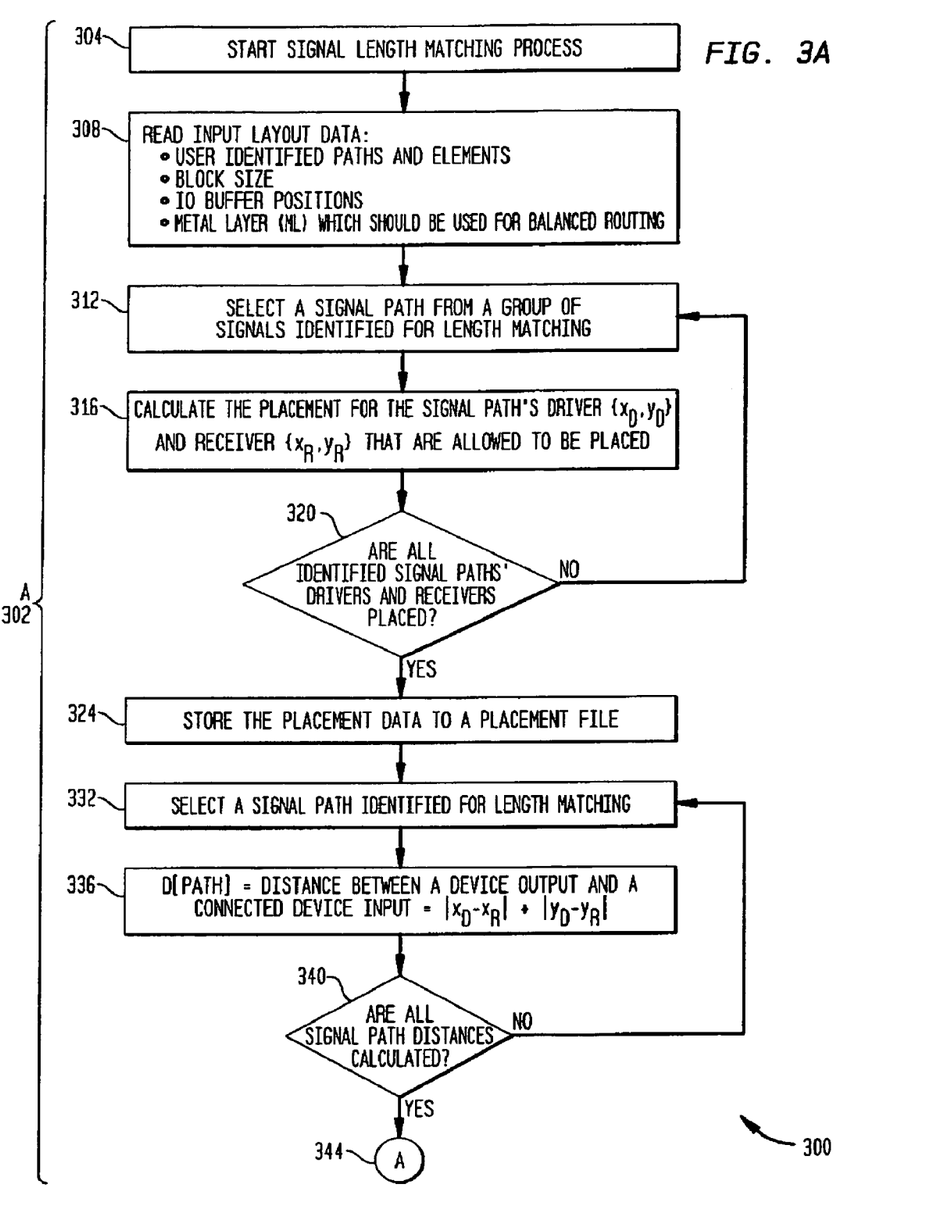
FIG. 3A illustrates part A of a signal length matching process in accordance with the present invention.

FIG. 3A illustrates part A 302 of a signal length matching process 300 in accordance with the present invention. The signal length matching process 300 may suitably be employed in the signal length matching process step 216 of FIG. 2. The signal length matching process 300 is started in step 304. In step 308, the layout data from the chip database 109 is read. The layout data includes, for example, user identified paths and elements, block size, input/output (I/O) buffer positions, and a metal layer (ML) or metal layers that should be used for balanced routing. The user identified paths and elements are organized as one or more groups of signals that are to be matched in length within an acceptable tolerance, such as 1%, within the group of signals.

Various options exist for placement and routing dependent upon the chip complexity and technology process used. For example, for optimum noise reduction, signals identified for length matching which are associated with a read operation or an input direction may be isolated from signals identified for length matching which are associated with a write operation or an output direction. The isolation may be obtained by placing the input direction signals in a metal layer separate from the output direction signals, for example. Further, both metal layers may also be separated and isolated from metal layers used to place and route other signals on the chip. Both input direction and output direction signals may be shielded as well.

Then, a signal path is selected from a group of signals identified for length matching in step 312. It is noted that multiple groups of signals may be specified each with a different length matching criteria based on the longest signal paths in each group of signals. Placement positions in chip-relative x and y coordinates for the selected signal path's driver $\{x_D, y_D\}$ and receiver $\{x_R, y_R\}$ that are allowed to be placed are calculated in step 316. In order to minimize or prevent possible wire shorts or wire overlaps, the placement of the I/O buffers is done in the floorplan chip step 208 in a specified order, for example, as specified in an ordered table which defines names for the I/O buffers. Placement data for other devices, such as flip flops, inverters, and the like that may be used in a signal path, are calculated in step 316. In decision step 320, it is determined whether the allowed driver and receiver devices for all of the signal paths identified for signal length matching have been placed. If all drivers and receivers have not been placed, the process proceeds back to step 312 and a new signal path is selected.

Once the drivers and receivers have been placed for all identified signal paths, the placement data is stored in step 324 to a placement file, such as may be stored in the chip database 109 of FIG. 1. For example, the placement data may be stored in ASCII form, or another such form that is compatible with the high level place and route process 200 of FIG. 2. The placement data includes, for example, instance names with coordinates and orientation information.

In step 332, a signal path identified for length matching is selected. In step 336, the distance D[path] is determined. All wires routed on the chip are either horizontal or vertical wires with no wires at different angles. The distance D[path] between two coordinates $\{X_D, Y_D\}$ of a device output such as a driver and a connected device input $\{X_R, Y_R\}$ such as a of a receiver, for example, is the absolute value of $(X_D-X_R)$ plus the absolute value of $(Y_D-Y_R)$. This distance is referred to herein as the layout distance between two points and may also be referred to as the Manhattan distance. Decision step 340 is used to determine whether all signal path distances have been calculated. If all signal path distances have not been calculated, the process proceeds back to step 332 where a new signal path is selected. If all signal path distances have been calculated, then the process continues to step A 344.

Figure 3B:
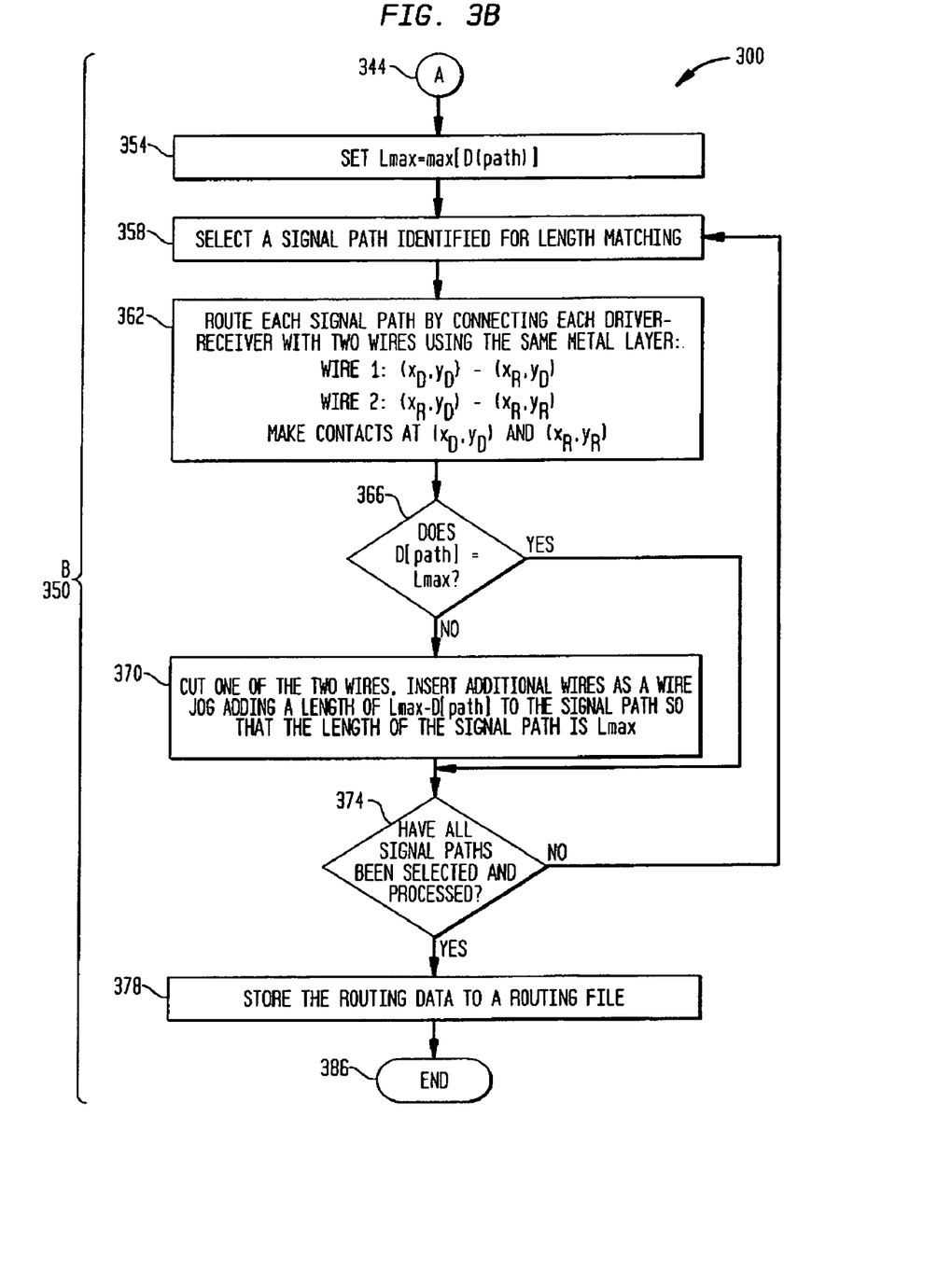
FIG. 3B illustrates part B of the signal length matching process in accordance with the present invention.

FIG. 3B illustrates part B 350 of the signal length matching process 300 in accordance with the present invention. Following step 344, step 354 sets a maximum length parameter Lmax to be equal to the maximum of the distances D[path] of all of the signal path distances calculated in step 336 in FIG. 3A within a specific group of signals. In step 358, a signal path identified for length matching is selected. In step 362, the signal path is routed by connecting a driver and a receiver for the selected signal path with one horizontal wire and one vertical wire using the shortest layout distance path available in the selected metal layer (ML). The wires in the group of signals to be length matched are routed with the same wire width to keep the delay balanced across the group of signals. The path length of this connection is the distance D[path] calculated for the signal path in step 336.

The path length D[path] is compared against Lmax in decision step 366. If the path length D[path] is not equal to the Lmax distance then the signal path is not of a matched length and should be lengthened. The signal path is lengthened in step 370. To lengthen a signal path, either the horizontal wire or the vertical wire is cut and additional wires are inserted between the cut lengths of the signal path, causing a jog in the signal path. The determination of whether to cut the horizontal wire or the vertical wire is dependent upon the placement area associated with the signal paths to be length matched. With sufficient room available for placement and routing, the selection to cut the vertical wire or the horizontal wire may be arbitrarily made, but the selection is kept consistent across the group of signals to be matched in length. The addition of the wire jog adds a length of Lmax-D[path] to the original routed signal path which had a length D[path] such that the length of the adjusted signal path is equal to Lmax within the precision of the adjustment and routing calculations. The dimensions of the wire jogs are chosen and the wire jogs inserted in the signal paths in locations to minimize crosstalk and to meet wire spacing requirements between wires. For example, a horizontal wire of a signal path may be chosen to be cut and a wire jog inserted at a point no less than 10 um away from the connecting point between the horizontal wire and the vertical wire of the signal path. Exemplary wire jogs 416, 418, and 4209 are shown in FIG. 4 and discussed further below in connection with FIG. 4.

In decision step 374, it is determined whether all identified signal paths have been selected and processed. If all identified signal paths have not been selected and processed the process proceeds to step 358 where a new signal path is selected and the process continues. If all identified signal paths have been selected and processed, then the routing data is stored in step 378 to a routing file such as may be stored in the chip database 109 of FIG. 1. After storing the routing data, then the signal length matching process 300 ends in step 386.

Figure 4:
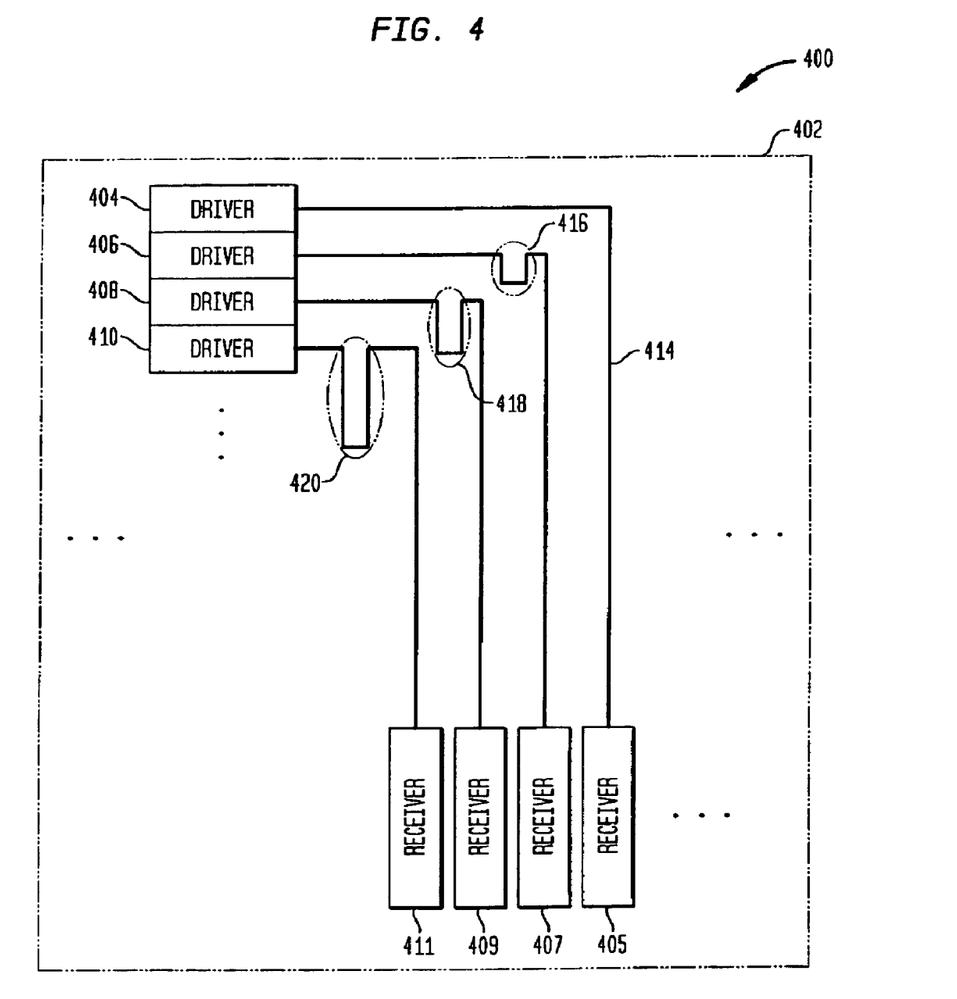
FIG. 4 illustrates four exemplary signal path routings achieved using the signal length matching process of FIGS. 3A and 3B in accordance with the present invention.

FIG. 4 illustrates four exemplary signal path routings 400 achieved using the signal length matching process 300 of FIG. 3A and 3B. A chip 402 typically has multiple metal layers (MLs) of which a single ML and a portion of the circuitry and signal paths are illustrated in FIG. 4. A group of four driver and receiver pairs {404, 405}, {406, 407}, {408, 409}, and {410, 411} are illustrated. Wire connections are to be made between the four driver and receiver pairs with the length of each signal path to be made of substantially equal length. Of the four signal paths, signal path 414 is determined to be the Lmax of the four signal paths. Since a direct path between the driver 406 and the receiver 407 is shorter than Lmax, the direct path is adjusted by first cutting the path. Then additional wires 416 are inserted to increase the length of the connection to match Lmax. In a similar manner, the signal paths between driver 408 and receiver 409, and driver 410 and receiver 411, are increased by use of additional wire jogs 418 and 420, respectively, so they each have a length of Lmax.

Figure 5:
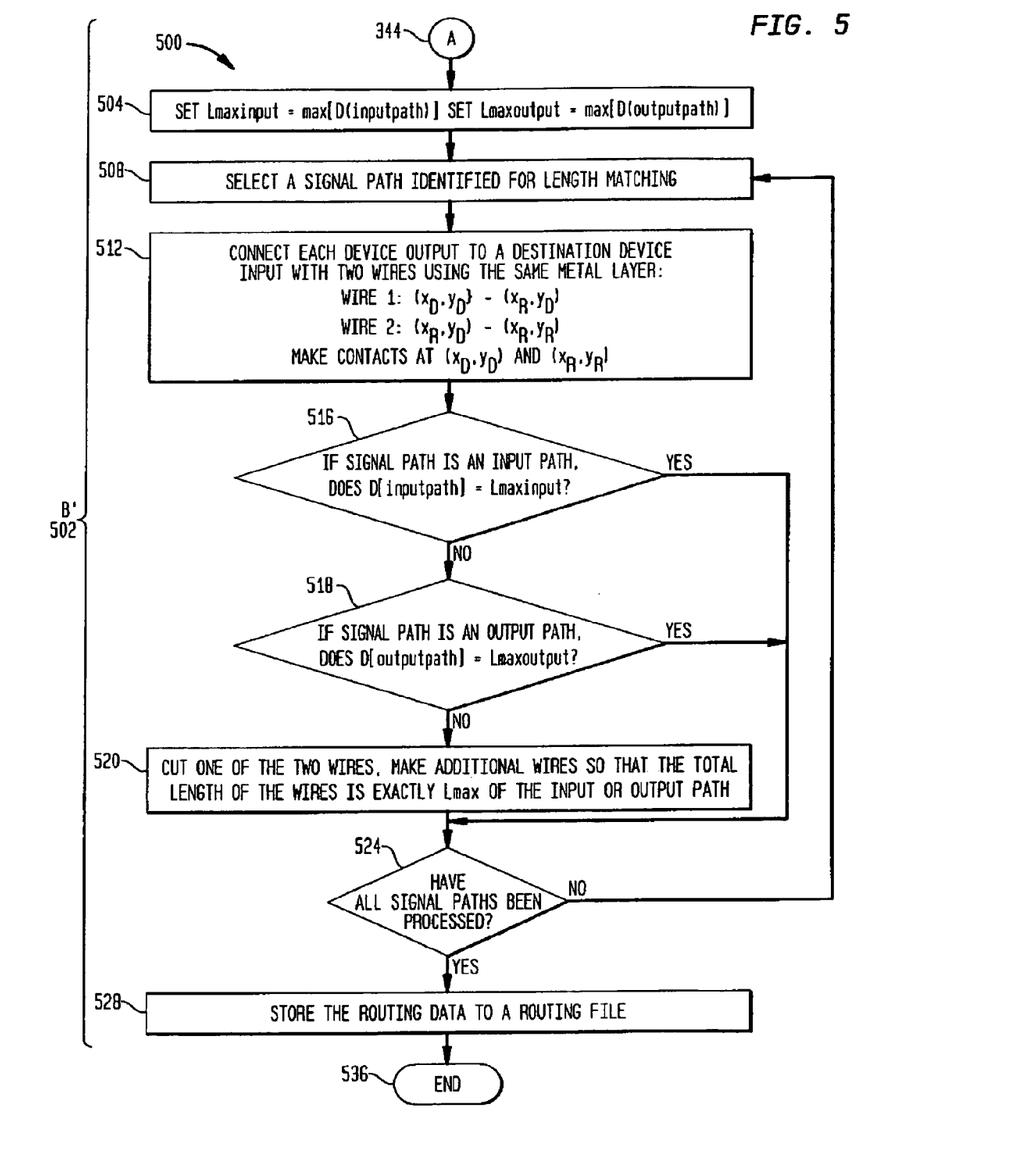
FIG. 5 illustrates part B', an alternative to part B, of the signal length matching process in accordance with the present invention.

FIG. 5 illustrates part B' 502, an alternative to part B 350, of the signal length matching process 300 in accordance with the present invention. It is realized that timing requirements for input signal paths may be different than timing requirements for output signal paths. To account for this difference, the length matching process adjusts output signal paths to have the same length and input signal paths to have the same length. The determination of whether a signal path is an input path or an output path may be by a flag or a signal name, for example.

It is also realized that the rise and fall signal timing are typically different due to the use of technology process library devices having unbalanced delays. To account for the unbalanced delays, pairs of inverters are inserted in a signal path. The pair of inverters compensates for unbalanced rise and fall timing skew of a single device. The signal length matching process 500 is used to reduce timing skew for input and output signal paths and to account for differences in device delays for rising and falling signal edges. The first inverter of the pair of inverters is inserted in a signal path close to the signal path's driver. The second inverter of the pair of inverters is inserted approximately midway in the signal path. The pair of inverters are considered part of the user identified path and elements. In step 336, the distances between a signal source output and a first inverter, a first inverter output and a second inverter input, and the second inverter output and the destination input are calculated for the input direction group of signals and for the output direction group of signals.

Following step 344, step 504 sets a maximum input length parameter Lmaxinput to be equal to the maximum of the input path distances D[inputpath] of all of the input signal path distances calculated in step 336 in FIG. 3A. Step 504 also sets a maximum output length parameter Lmaxoutput to be equal to the maximum of the output path distances D[outputpath] of all the output signal path distances. In step 508, a signal path identified for length matching is selected. In step 512, each device output is connected to the signal destination device input for the selected signal path by one horizontal wire and one vertical wire. The horizontal and vertical wires are chosen using the shortest path available in the selected metal layer (ML). The path length of each of these connections is the distance D[path] calculated for each signal path in step 336.

If the signal path is an input path, the path length D[inputpath] is compared against Lmaxinput in decision step 516. If the path length D[inputpath] is not equal to the Lmaxinput distance then the input signal path is not of a matched length and should be lengthened. If the signal path is not an input path or the input signal path length is not equal to Lmaxinput, the process 500 proceeds to decision step 518.

If the signal path is an output path, then in decision step 518 the output path length D[outputpath] is compared against Lmaxoutput. If the path length D[outputpath] is not equal to the Lmaxoutput distance then the output signal path is not of a matched length and should be lengthened. For both decision steps 516 and 518, if D[inputpath]=Lmaxinput and D[outputpath]=Lmaxoutput, respectively, then the process 500 proceeds to decision step 524, bypassing the length adjustment step 520.

In step 520, the length of the input path or the length of the output path is adjusted. To lengthen a signal path, either the horizontal wire or the vertical wire is cut and additional wires are inserted between the cut lengths of the signal path, causing a jog in the signal path. The lengths of the additional wires are chosen such that the length of the adjusted signal path is equal to Lmax of the input or output path. In decision step 524, it is determined whether all identified signal paths have been processed. If all identified signal paths have not been processed the process proceeds to step 508 where a new signal path is selected and the process continues. If all identified signal paths have been processed, then the routing data is stored in step 528 to a routing file such as may be stored in the chip database 109 of FIG. 1. If all signal paths have been processed, then the signal length matching process 500 ends in step 536.

Figure 6:
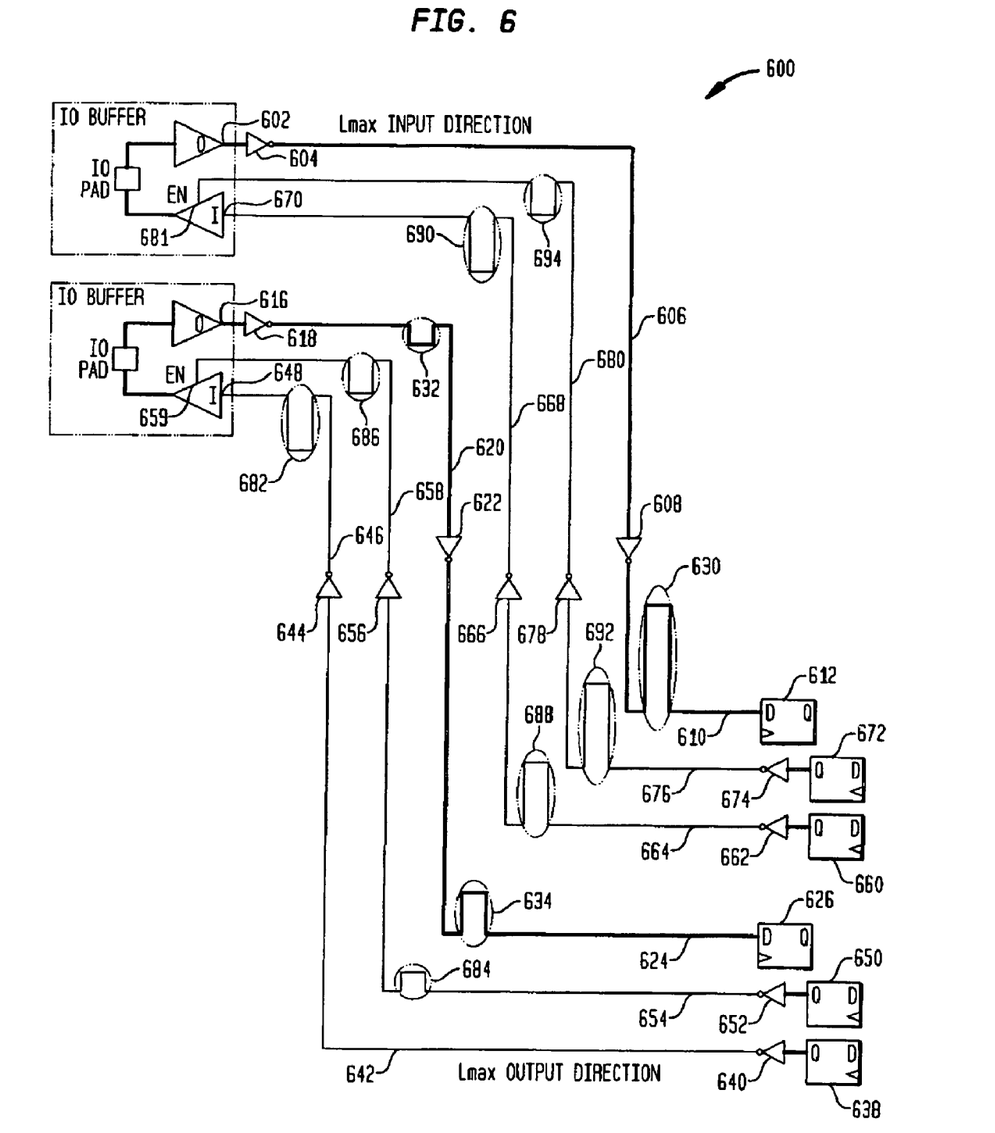
FIG. 6 illustrates a second exemplary signal path routing achieved using the signal length matching process of FIG. 3A and the process of FIG. 5 in accordance with the present invention.

FIG. 6 illustrates a second exemplary signal path routing 600 achieved using the signal length matching process 300 of FIG. 3A and the process 500 of FIG. 5 in accordance with the present invention. The signal length matching process 500 is used to reduce timing skew on input and output paths and to account for the difference in device delays for rising and falling signal edges. Each signal path uses a pair of inverters to compensate for the rising and falling edges though other types of signal inverting devices may be used.

Two signal paths with pairs of inverters in the input direction are shown in the signal path routing 600. The first input path consists of an IO Buffer driver output 602, a first inverter 604, a signal path 606, a second inverter 608, a signal path 610, and an input device 612. The second input path consists of an I/O buffer driver output 616, a first inverter 618, a signal path 620, a second inverter 622, a signal path 624, and an input device 626. The longest signal path in the input direction for the purposes of length matching is the signal path 606. The other signal paths in the input direction 610, 620, and 624 are adjusted to match the length of signal path 606 by the insertion of adjustment wires 630, 632, and 634, respectively.

Four signal paths with pairs of inverters in the output direction are shown in the signal path routing 600. The first output path consists of a signal source 638, a first inverter 640, a signal path 642, a second inverter 644, a signal path 646, and an IO buffer receiver input 648. The second output path consists of a signal source 650, a first inverter 652, a signal path 654, a second inverter 656, a signal path 658, and an IO buffer receiver enable (EN) input 659. The third output path consists of a signal source 660, a first inverter 662, a signal path 664, a second inverter 666, a signal path 668, and an IO buffer receiver input 670. The fourth output path consists of a signal source 672, a first inverter 674, a signal path 676, a second inverter 678, a signal path 680, and an IO buffer receiver EN input 681. The longest signal path in the output direction for the purposes of length matching is the signal path 642. The other signal paths in the output direction 646, 654, 658, 664, 668, 676, and 680 are adjusted to match the length of signal path 642 by the insertion of adjustment wires 682, 684, 686, 688, 690, 692, and 694, respectively. It is noted, that the short wired connections from a signal source to the first inverter is considered to have negligible effects on the timing skew and are not included in the length matching process.

As an example, a double data rate (DDR) memory interface with DDR memory speed exceeding 1 Gb/s may be placed and routed using the signal length matching process 300 and process 500. The resulting placement and routing may be incorporated in a number of different chips requiring a DDR memory interface depending upon the chip's requirements. In a specific implementation, multiple DDR interfaces may be used. For example, four DDR interfaces each exceeding 1 Gb/s may be used to provide a very high bandwidth memory interface. Each DDR interface, for example, uses 159 I/O buffers made up of 104 data signals, 24 strobes, 6 clocks, and 25 address/command signals. The data signals and strobes are bidirectional, such that, each data signal, for example, is made up of three critical paths, a data in path, a data out path, and an enable path. The other signals are unidirectional and require only one critical path per buffer. The total number of critical signal paths for each DDR interface is then 3*(104+24)+(25+6)=415 critical signal paths. With four such DDR interfaces, there are 4*415=1,660 critical signal paths. The signals in the DDR interface travel through the chip layout, I/O buffers, chip package connections, printed circuit board (PCB) connections, PCB signal paths, and the external DDR memory. Proper circuit operation is highly sensitive to the timing of the DDR signals due to their high clocking rates. In addition, both positive and negative edges of strobes are used to transfer data to internal flip flops on the chip. Signal skew between the data and strobes is highly critical and is reduced using the advantageous techniques of the signal length matching program.

As part of the DDR interface, delay lines may be used for example on the 24 strobes to provide a ¼ period delay to position the strobe in the middle of a data bit period. With memory speeds at 1 G/s or greater, the clock period is 1 nanosecond or less. A ¼ period delay amounts to 250 picosecondsor less. At these data rates, the signal path length is critical to controlling timing skew. To provide a chip relative control for delivering a ¼ period delay, the delay lines are each controllable depending on the process, voltage, and temperature (PVT) conditions encountered on the chip, which may be different on each chip. The PVT is measured on chip and an appropriate control signal is sent to the delay lines to cause the same delay in each delay line. By matching the signal lengths, the signal skew is reduced. In a specific implementation, a signal skew on the order of 10-20 picoseconds was achieved using the techniques of this invention.

In order to avoid or minimize any interaction between critical signal paths and the rest of the chip logic, layout constraints are specified for the DDR interfaces. One such constraint is to keep the critical signal path routing away from other signals in order to minimize the affect the other signals may have on critical signal path timing. For example, the identified signal paths may be specified to be routed only in a single metal layer (ML), such as ML four or five and the rest of the chip signal paths routed in the remaining metal layers. By careful floor planning this segregation of signal paths may be achieved.

The signal length matching process is able to match the length of the selected signal paths to be substantially equal within the limits of precision of the routing program and implementation process. Also, since the selected signals are routed within a single metal layer, all of the selected signals have the same type of driver and receiver cells on the signal paths and the signals propagate through almost the same environment. As a result, the selected signals have almost the same timing at the receiving signal end. Variations in timing may be due to other parameters that may be different for each of the selected signals. For example, another signal routed close to one of the selected signals may induce cross talk noise or otherwise detrimentally affect the timing of the selected signal.

While the present invention has been disclosed in a presently preferred context, it will be recognized that the present teachings may be adapted to a variety of contexts consistent with this disclosure and the claims that follow.

For example, the present invention is disclosed mainly in the context of signal length matching. It will appreciated that it may also be employed to match groups of signals to a specific timing delay. It will also be appreciated that variations in the particular hardware and software employed are feasible, and to be expected as both evolve with time. For example, various programming languages other than C may be used to implement a signal length matching process. Other variations may include different approaches to determining groupings of signals beyond input and output signal path direction such as groupings based on signal function. Also, different groups of signals may be allocated space on different metal layers. Other such modifications and adaptations to suit a particular design application will be apparent to those of ordinary skill in the art.

I claim:

1. A method for reducing timing skew, the method comprising:

identifying signal paths with rise and fall timing skews that are to be reduced to ensure timing requirements are met for correct signal operation, wherein the signal paths are identified from a chip database prior to routing the signals;

inserting a serially coupled pair of signal inverting devices to compensate for unbalanced rise and fall timing skews in each identified signal path to form identified signal inverting paths, wherein the identified signal inverting paths include signal paths connected to and between the serially coupled pair of signal inverting devices;

calculating the signal path distances for the identified signal inverting paths;

finding, among the identified signal inverting paths, a longest signal path;

lengthening selected signal paths of the remaining identified signal inverting paths to each have a length substantially equal to the longest signal path whereby delays of the identified signals are balanced and the rise and fall timing skews between the identified signal paths are reduced;

placing in the signal path of each identified signal path a first signal inverting device close to the signal source of the identified signal, whereby the path connected from the signal source to the first signal inverting device is not selected for lengthening;

placing in the signal path of each identified signal path a second signal inverting device midway in the signal path between the first signal inverting device and the receiving end of the signal path; and identifying the longest signal path among the signal paths connecting each first signal inverting device to its associated second signal inverting device and among the signal paths connecting each second signal inverting device to its associated receiving end of the signal path.

2. The method of claim 1 wherein the lengthening is accomplished by inserting wire jogs in the signal paths.

3. The method of claim 2 further comprising:

constructing wire jogs with dimensions matched to the signal path to be lengthened and to meet wire spacing requirements between wires once the wire jog has been inserted in the signal paths.

4. The method of claim 1 wherein the routing is confined to a single metal layer.

5. A computer-readable medium storing a computer readable program which when executed by a computer system, performs a path length matching process by performing the steps of:

identifying signal paths that are to have a matching length to ensure timing requirements are met for correct signal operation, wherein the signal paths are identified from a chip database prior to routing the signals;

inserting a serially coupled pair of signal inverting devices to compensate for unbalanced rise and fall timing skews in each identified signal path to form identified signal inverting paths, wherein the identified signal inverting paths include signal paths connected to and between the serially coupled pair of signal inverting devices;

calculating the signal path distances for the identified signal inverting paths;

finding, among the identified signal inverting paths, a longest signal path;

lengthening selected identified signal inverting paths having a signal path with a length less than the longest signal path to produce adjusted signal paths each with a length substantially equal to the longest signal path whereby delays of the identified signals are balanced and rise and fall timing skews between the identified signal paths are reduced;

placing in the signal path of each identified signal path a first signal inverting device close to the signal source of the identified signal, whereby the path connected from the signal source to the first signal inverting device is not selected for lengthening;

placing in the signal path of each identified signal path a second signal inverting device midway in the signal path between the first signal inverting device and the receiving end of the signal path; and identifying the longest signal path among the signal paths connecting the first signal inverting devices to their associated second signal inverting devices and among the signal paths connecting the second signal inverting devices to their associated receiving ends of the signal paths.

6. The computer-readable medium of claim 5 wherein the identifying further comprising:

grouping signal paths according to a functional feature that is common to a subset of the signal paths, wherein these grouped signal paths are the identified signals that are to have a matching length.

7. The computer-readable medium of claim 6 wherein a first functional feature is signals that are input signals.

8. The computer-readable medium of claim 6 wherein a second functional feature is signals that are output signals.

9. The computer-readable medium of claim 5 further comprising:

selecting to cut a vertical wire or a horizontal wire of one of the identified signal paths with a length less than the longest signal path;

cutting the chosen wire;

determining a length of a wire jog whereby the length of the signal path after inserting the wire jog is substantially equal to the longest signal path; and inserting the wire jog between the cut chosen wire.

10. The computer-readable medium of claim 9 wherein the wire jog is inserted a predetermined distance from the connection point of the horizontal and vertical wires.

\* \* \* \* \*